B. B. BACHMAN.
BAND BRAKE.
APPLICATION FILED OCT. 11, 1909.
971,103.
Patented Sept. 27, 1910.
2 SHEETS—SHEET 1.
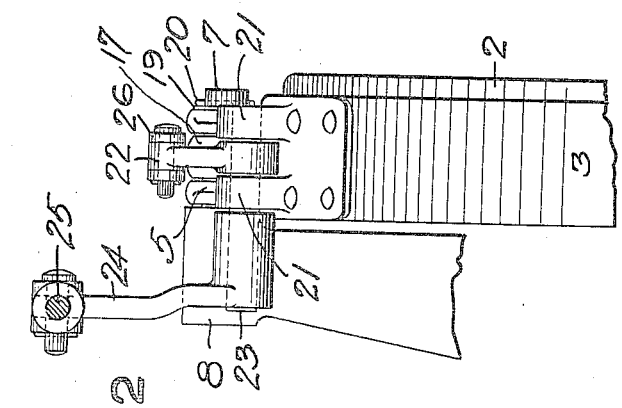
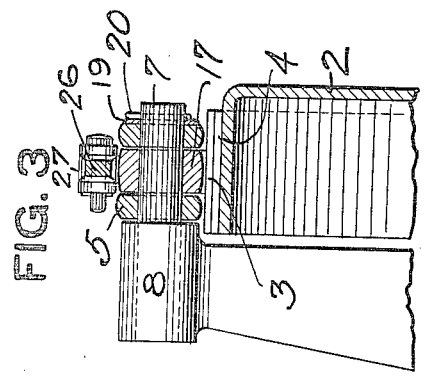
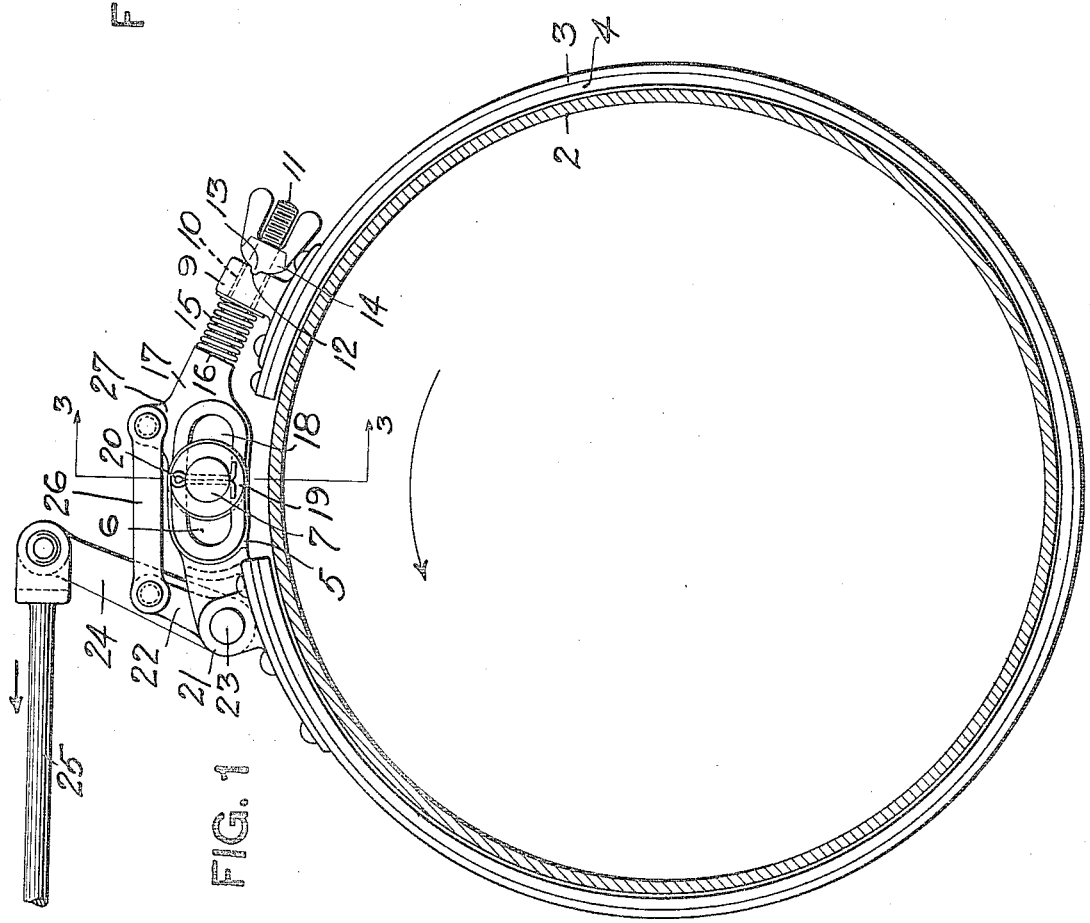
WITNESSES.
J. R. Keller
Robt. C. Totten
INVENTOR.
Benjamin B. Bachman
By Kay & Totten
Attorneys

B. B. BACHMAN.
BAND BRAKE.
APPLICATION FILED OCT. 11, 1909.

971,103.

Patented Sept. 27, 1910.

2 SHEETS—SHEET 2.

WITNESSES.
J. R. Keller
Robert C. Totten

INVENTOR.
Benjamin B. Bachman
By Kay & Totten
Attorneys

UNITED STATES PATENT OFFICE.

BENJAMIN B. BACHMAN, OF PHILADELPHIA, PENNSYLVANIA, ASSIGNOR TO THE AUTOCAR COMPANY, OF ARDMORE, PENNSYLVANIA, A CORPORATION OF PENNSYLVANIA.

BAND-BRAKE.

971,103.  Specification of Letters Patent.  Patented Sept. 27, 1910.

Application filed October 11, 1909. Serial No. 522,006.

*To all whom it may concern:*

Be it known that I, BENJAMIN B. BACHMAN, a resident of Philadelphia, in the county of Philadelphia and State of Pennsylvania, have invented a new and useful Improvement in Band-Brakes; and I do hereby declare the following to be a full, clear, and exact description thereof.

My invention relates to band-brakes.

The object of my invention is to provide a band brake which is simple in construction and efficient in operation.

To this end my invention comprises the novel features hereinafter set forth and claimed.

Figure 4:
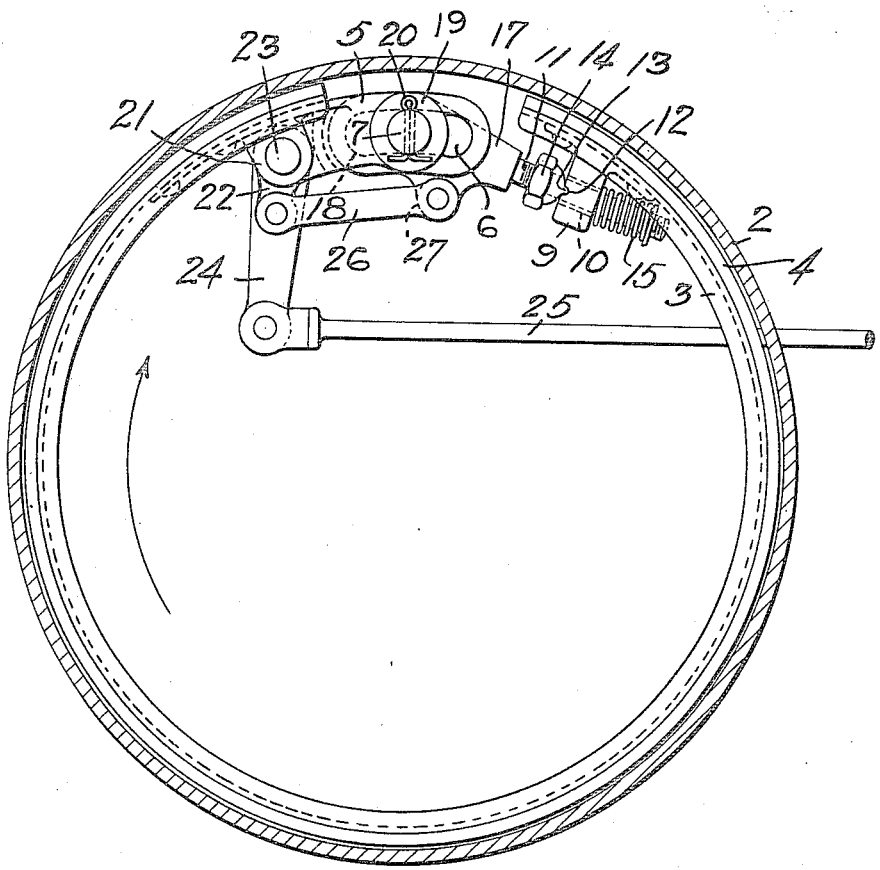
Figure 5:
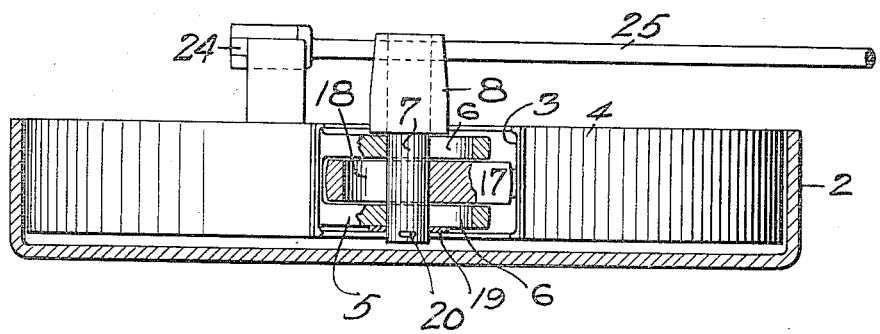

In the drawings, Figure 1 is a side elevation of my improved band-brake; Fig. 2 is an end view partly broken away; Fig. 3 is a section on the line (3—3) Fig. 1; and Fig. 4 and Fig. 5 show a modified form of my invention.

The numeral 2 designates a revolving drum which may be attached to either of the wheels of the driving mechanism of the vehicle. The curved arrow shows the direction in which the wheels are assumed to rotate when the vehicle is moving forward.

A flexible band 3 of steel or other suitable material is provided on the inner face of which is riveted or otherwise attached the band 4 of some suitable material adapted for facing brake surfaces. Riveted or otherwise secured to one end of the band 3 is the female clevis 5, which is provided with the elongated slot 6. The pin 7 passes through the slot 6, said pin being rigidly fixed in the brake-supporting arm 8. Riveted or otherwise secured to the opposite end of the band is the lug 9 provided with the opening 10 through which the stud or pin 11 passes freely, and said lug 9 is notched as at 12 to receive the tongue or projection 13 on the adjusting nut 14. The spring 15 is interposed between the shoulder 16 and lug 9, said spring acting by its pressure to hold the nut 14 in engagement with the seat 12 of the lug 9.

Connected with the pin 11 is the male clevis 17 which is provided with the slot 18 through which the pin 7 passes. The washer 19 engages the outer end of the pin 7 and the split pin 20 passes through said pin 7 outside said washer.

The clevis 5 is provided with the lugs 21 and the arm 22 is held between said lugs by the pin 23. This pin 23 is connected to the arm 24, which is connected at its upper end to the operating rod 25. The link 26 connects the upper end of the arm 22 with the lug 27 on the male clevis 17.

When my improved band brake is in use, and it is desired to make application of brakes when the drum 2 is rotating in the direction of the curved arrow, the rod 25 is moved in the direction of the arrow. Through the movement of the lever 24 the arm 22 is operated so as to draw upon the link 26, and cause the female clevis 5 and male clevis 17 to approach each other until there is frictional engagement between band 4 and drum 2. Due to this engagement the brake moves with the drum until the end of slot 6 in female clevis 5 anchors against the pin 7. After this condition obtains the friction between band 4 and drum 2 it tends to wrap around the drum, thus multiplying the braking effort with very little exertion on part of the operator. Also my brake will work with equal efficiency if the drum 2 rotates in the opposite direction, as in that case the brake will rotate with the drum until the end of the slot 18 in male clevis 17 anchors against the pin 7. Suitable lugs and springs will be provided to keep the band free at all points from the drum when the brake is out of engagement. As these parts form no part of my invention they have been omitted in the illustration.

In the existing forms of band-brakes the weighty portions or the operating mechanism of the brake, makes it necessary to provide some arrangement to support this weight. In my construction, I employ the brake pin as the means of supporting the entire weight of the mechanism. Furthermore in my adjustment for wear, I have overcome the difficulties that are found in existing designs where an adjustment of the brakes necessitates an adjustment of the external linkage in order to keep the same relationship between the various parts of the mechanism. It is apparent from my construction that by adjusting the nut 14 the brake-band may be shortened without altering the relationship of any of the other parts.

In Fig. 4, I have shown my invention as applied internally and, as the construction is identically the same with the parts simply inverted, I have not deemed it necessary to enter into a detailed description of the same.

What I claim is:

1. In a band brake, the combination with a drum or like brake body of a band partially encircling same, of slotted clevis members secured to said band a pin engaging said members, one of said members being adjustable, and means for moving said clevis members with reference to each other to draw the ends of said band toward each other.

2. In a band brake, the combination with a drum or like brake body, of a band partially encircling same, slotted clevis members connected to said band a pin engaging said members, one of said clevis members being adjustably supported on said band, and means for operating said clevis members to draw the ends of said band toward each other.

3. In a band brake, the combination with a drum or like body, of a band partially encircling same, a slotted clevis member secured to one end of said band, a support on the other end of said band, a slotted clevis member passing through said support, an adjusting nut on said last named clevis engaging said support, a spring interposed between said support and the shoulder on the last named clevis member, a pin engaging said clevis members, and means for moving said clevis members to draw the ends of said band toward each other.

4. In a band brake, the combination with a drum or like body of a band partially encircling same, a slotted clevis member secured to one end of said band, a support on the opposite end of said band, a slotted clevis member passing through said support, said support having a notch therein, an adjusting nut engaging said clevis member and said notch, a spring interposed between said support and the shoulder on said clevis member, the band engaging said clevis members, and means for operating said clevis members to draw the ends of said band toward each other.

In testimony whereof, I the said BENJAMIN B. BACHMAN have hereunto set my hand.

BENJAMIN B. BACHMAN.

Witnesses:
WILLIAM TASKER DUNBAR,
ROBT. W. SIMMONS.